US007797577B2

(12) United States Patent
Kalos et al.

(10) Patent No.: US 7,797,577 B2
(45) Date of Patent: *Sep. 14, 2010

(54) REASSIGNING STORAGE VOLUMES FROM A FAILED PROCESSING SYSTEM TO A SURVIVING PROCESSING SYSTEM

(75) Inventors: Matthew Joseph Kalos, Tucson, AZ (US); Dale Francis Riedy, Jr., Poughkeepsie, NY (US); Richard Anthony Ripberger, Tucson, AZ (US); Harry Morris Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/189,104

(22) Filed: Aug. 8, 2008

(65) Prior Publication Data

US 2008/0301495 A1    Dec. 4, 2008

Related U.S. Application Data

(63) Continuation of application No. 10/990,038, filed on Nov. 15, 2004, now Pat. No. 7,437,608.

(51) Int. Cl.
    *G06F 11/00*    (2006.01)
(52) U.S. Cl. ..................................................... 714/16
(58) Field of Classification Search ................... 714/16
    See application file for complete search history.

(56) References Cited

U.S. PATENT DOCUMENTS

| 5,051,887 | A | * | 9/1991 | Berger et al. ................. 711/162 |
| 5,455,934 | A | * | 10/1995 | Holland et al. .................. 711/4 |
| 5,790,775 | A | * | 8/1998 | Marks et al. .................... 714/9 |
| 5,852,724 | A |   | 12/1998 | Glenn, II et al. |
| 5,922,077 | A | * | 7/1999 | Espy et al. ...................... 714/7 |

(Continued)

OTHER PUBLICATIONS

Tech Notes by Martin Schmitz May 2006, pdf file.

(Continued)

*Primary Examiner*—Bryce P Bonzo
*Assistant Examiner*—Amine Riad
(74) *Attorney, Agent, or Firm*—David W. Victor; Konrad Raynes & Victor LLP

(57) ABSTRACT

Provided are a method, system, and program for reassigning storage volumes from a failed processing system to a surviving processing system. A first processing system detects a failure of a second processing system. The first processing system determines device groups of storage devices managed by the failed second processing system and determines for each determined device group, hosts that connect to storage devices in the device group. The first processing system sends, for each device group, a unit check to each determined host indicating failure of each device group through one storage device in the device group to which the determined host connects. The determined hosts execute instructions to terminate any I/O operations in progress on the storage devices in the device group in response to the unit check indicating failure of one storage device in the device group and issue, a command to one storage device for the device group to end the busy condition.

24 Claims, 5 Drawing Sheets

U.S. PATENT DOCUMENTS

| | | | |
|---|---|---|---|
| 5,944,838 A * | 8/1999 | Jantz | 714/6 |
| 5,968,182 A | 10/1999 | Chen et al. | |
| 5,991,900 A | 11/1999 | Garnett | |
| 6,145,066 A | 11/2000 | Atkin | |
| 6,167,459 A | 12/2000 | Beardsley et al. | |
| 6,412,078 B2 | 6/2002 | Murotani et al. | |
| 6,526,521 B1 * | 2/2003 | Lim | 714/4 |
| 6,766,470 B1 * | 7/2004 | Shah | 714/9 |
| 6,769,071 B1 * | 7/2004 | Cheng et al. | 714/4 |
| 6,802,021 B1 | 10/2004 | Cheng et al. | |
| 6,898,730 B1 | 5/2005 | Hanan | |
| 6,973,586 B2 | 12/2005 | Petersen et al. | |
| 7,058,846 B1 * | 6/2006 | Kelkar et al. | 714/4 |
| 7,076,690 B1 | 7/2006 | Todd et al. | |
| 7,085,962 B1 * | 8/2006 | Hamilton et al. | 714/15 |
| 7,093,155 B2 | 8/2006 | Aoki | |
| 7,111,084 B2 | 9/2006 | Tan et al. | |
| 7,130,909 B2 | 10/2006 | Yamashita et al. | |
| 7,134,040 B2 | 11/2006 | Ayres | |
| 7,139,930 B2 | 11/2006 | Mashayekhi et al. | |
| 7,210,068 B1 * | 4/2007 | Aiello et al. | 714/43 |
| 7,251,743 B2 * | 7/2007 | Chen et al. | 714/6 |
| 7,281,154 B2 * | 10/2007 | Mashayekhi et al. | 714/4 |
| 7,308,604 B2 | 12/2007 | McDonnell et al. | |
| 7,320,083 B2 | 1/2008 | Davies et al. | |
| 2004/0098637 A1 | 5/2004 | Duncan et al. | |
| 2004/0267980 A1 | 12/2004 | McBrearty et al. | |

OTHER PUBLICATIONS

Sun StorageEdge T3 and T3+ Array Administrator's Guide by Sun Microsystems Apr. 2001.

Z/VM Storage Update: DS6000 and DS8000 by Steve Wilkins May 2005.

\* cited by examiner

Connection Information Entry

Logical Control Unit Information Entry

Storage Device Information

US 7,797,577 B2

REASSIGNING STORAGE VOLUMES FROM A FAILED PROCESSING SYSTEM TO A SURVIVING PROCESSING SYSTEM

RELATED APPLICATIONS

This patent application is a continuation of U.S. patent application Ser. No. 10/990,038, filed on Nov. 15, 2004, which patent application is incorporated herein by reference in their entirety.

BACKGROUND OF THE INVENTION

1. Field of the Invention

The present invention relates to reassigning storage volumes from a failed processing system to a surviving processing system.

2. Description of the Related Art

In certain computing environments, multiple host systems may communicate with one or more control units, such as an IBM Enterprise Storage Server (ESS)®, for data in a storage device managed by the ESS receiving the request. The control unit manages access to storage devices, such as interconnected hard disk drives through one or more logical paths. (IBM and ESS are registered trademarks of IBM). The interconnected drives may be configured as a Direct Access Storage Device (DASD), Redundant Array of Independent Disks (RAID), Just a Bunch of Disks (JBOD), etc.

Typically, the storage systems managed by the control unit includes numerous interconnected hard disk drives from which volumes are configured for the hosts to use. The storage devices may be configured as one or more arrays, such as RAID arrays, and the array storage space then assigned to volumes.

Certain control units include dual processing complexes or systems, each managing access to different sets of logical control units, where each logical control unit is assigned a plurality of storage volumes, such as logical volumes. If one processing complex fails, then the logical control units assigned to the failed processing complex would be reassigned to the surviving processing complex. As part of this failover, the surviving processor sends unit check status to each host for each storage device to which the host is connected to alert them of the failure so that the hosts may redrive any pending Input/Output (I/O) requests. As control units are allowing hosts to connect to ever increasing numbers of storage volumes, the hosts may have to consume substantial computational resources to handle unit checks received as part of a failover to the storage devices (volumes) to which the host is connected.

SUMMARY

Provided are a method, system, and program for reassigning storage volumes from a failed processing system to a surviving processing system. A first processing system detects a failure of a second processing system. The first processing system determines device groups of storage devices managed by the failed second processing system and determines for each determined device group, hosts that connect to storage devices in the device group. The first processing system sends, for each device group, a unit check to each determined host indicating failure of each device group through one storage device in the device group to which the determined host connects. The determined hosts execute instructions to terminate any I/O operations in progress on the storage devices in the device group in response to the unit check indicating failure of one storage device in the device group and issue, a command to one storage device for the device group to end the busy condition.

DETAILED DESCRIPTION

Figure 1:
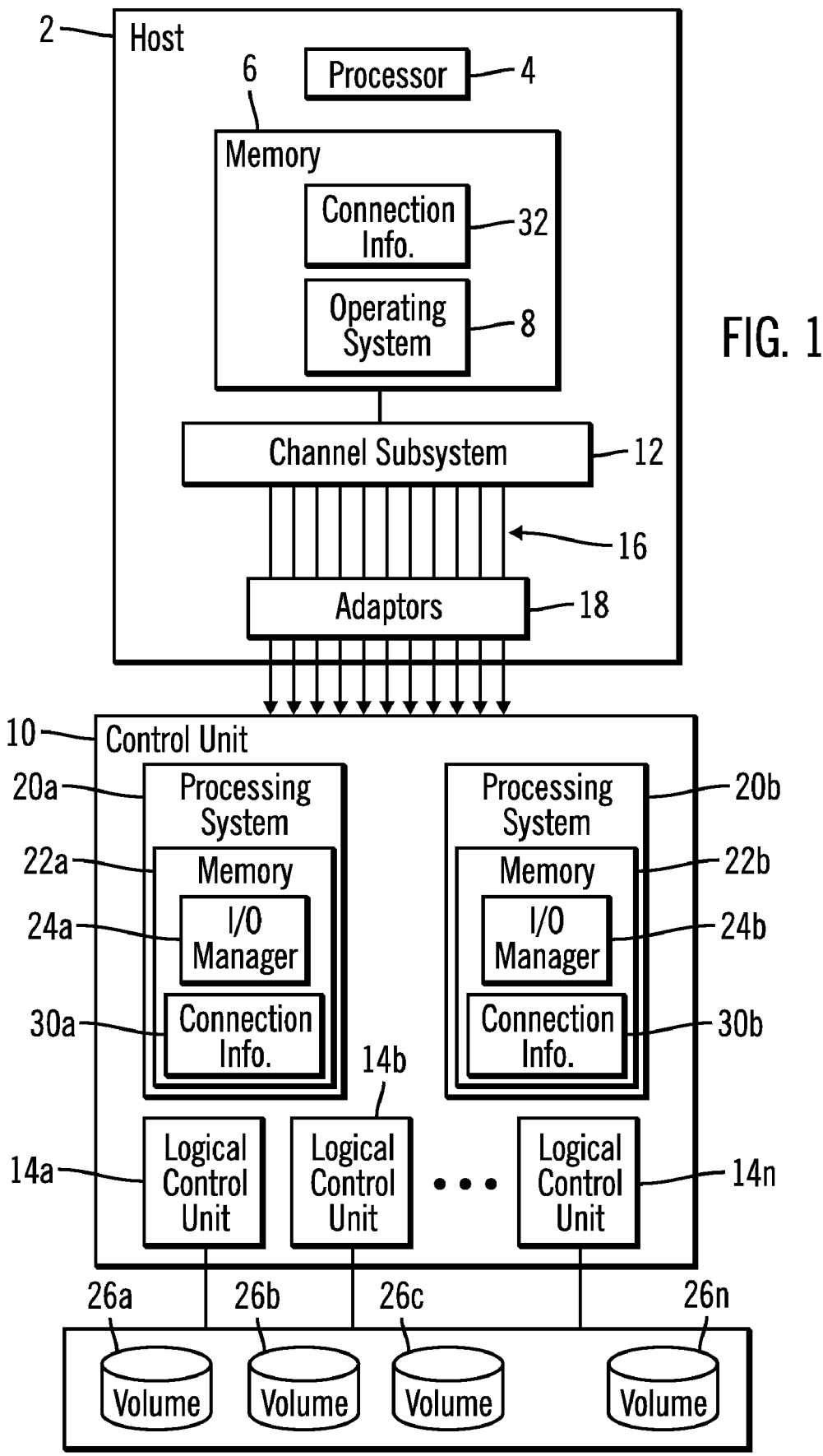
FIG. 1 illustrates an embodiment of a computing environment.

FIG. 1 illustrates an embodiment of a computing environment in which aspects of the invention are implemented. One or more hosts 2 (only one is shown) include a processor 4, a memory 6, and an operating system 8 for handling I/O requests from applications. The operating system 8 communicates I/O requests to a control unit 10 through a channel subsystem 12 that provides a plurality of logical paths to the logical control units 14*a*, 14*b* . . . 14*n* configured with the control unit 10 system. The channel subsystem 12 manages logical paths 16 extending through adaptors 18. An adaptor 18 provides the physical layer through which logical paths 16 extend to the control unit 10. The channel subsystem 8 may further associate multiple logical paths 16 with a path group, where all the paths in a path group may be used to communicate with logical control units 14*a*, 14*b* . . . 14*n* configured in the control unit 10. The control unit 10 includes two processing systems 20*a*, 20*b*, each including a memory 22*a*, 22*b* having an I/O manager 24*a*, 24*b* to manage I/O requests from the host 2 directed to volumes 26*a*, 26*b* . . . 26*n*, i.e., logical volumes, logical devices, etc., in a storage system 28. The processing systems 20*a*, 20*b* maintain connection information 30*a*, 30*b* to manage connections from the hosts 2 to the volumes 26*a*, 26*b* . . . 26*n*. The host 2 also maintains connection information 32 on connection paths from the host 2 to storage volumes 26*a*, 26*b* . . . 26*n*. The variable "n" is used to denote an integer instance of an element, and may indicate different or the same integer value when used with different elements. For instance, 14*n* and 26*n* may indicate a same or different number of logical control units 14*n* and volumes 26*n*.

Figure 2:
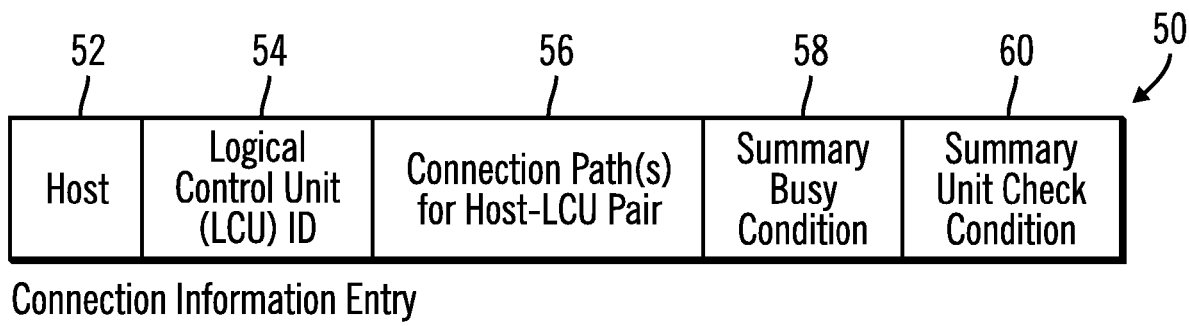
FIG. 2 illustrates an embodiment of connection information.

FIG. 2 illustrates the connection information maintained by all processing systems, such as the I/O managers 24*a*, 24*b* in processing systems 20*a*, 20*b*, for a host-LCU (Logical Control Unit) pair, including: a host identifier (ID) 52 and LCU identifier 54 of the host and LCU involved in the connection (i.e. a path group); one or more connection paths 56 involved in the connection; a summary busy condition 58 indicating whether to return busy to certain requests from the identified host 2 on the storage devices associated with the identified logical control unit; and a summary unit check condition 60 indicating that a special unit check condition is pending for any one of the storage devices associated with the identified logical control unit 14*a*, 14*b* . . . 14*n* when communicating with the identified host associated with this host-LCU pair.

Figure 3:
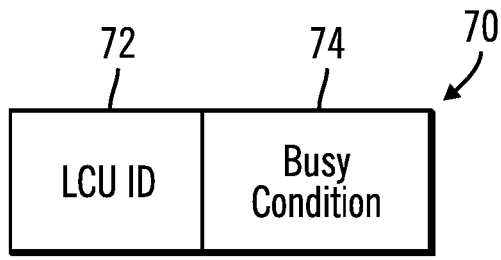
FIG. 3 illustrates an embodiment of information showing storage devices (volumes) assigned to a logical control unit.

FIG. 3 illustrates logical control unit information 70 including a logical control unit identifier (LCU ID) 72 and a busy condition 74 indicating whether to return busy to any requests from any host initiating requests to the storage devices associated with the logical control unit.

Figure 4:
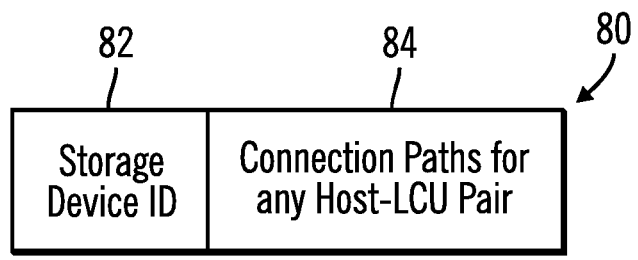
FIG. 4 illustrates an embodiment of information maintained for a host indicating a unit check busy condition.

FIG. 4 illustrates storage device information 80 maintained by the I/O managers 24a, 24b for a storage device, including a storage device identifier (ID) 82 and one or more connection paths 84 between the identified storage device and any host 2. The set of connection paths that a given storage device has with a given host can be determined as the intersection of the storage device connection paths 84 and the host-LCU connection paths 56 in FIG. 2 (not all connections for the host-LCU pair may apply to every device on the LCU). In one embodiment, only storage devices that have a connection to a given host are considered for presenting summary unit check status as described below.

Figure 5:
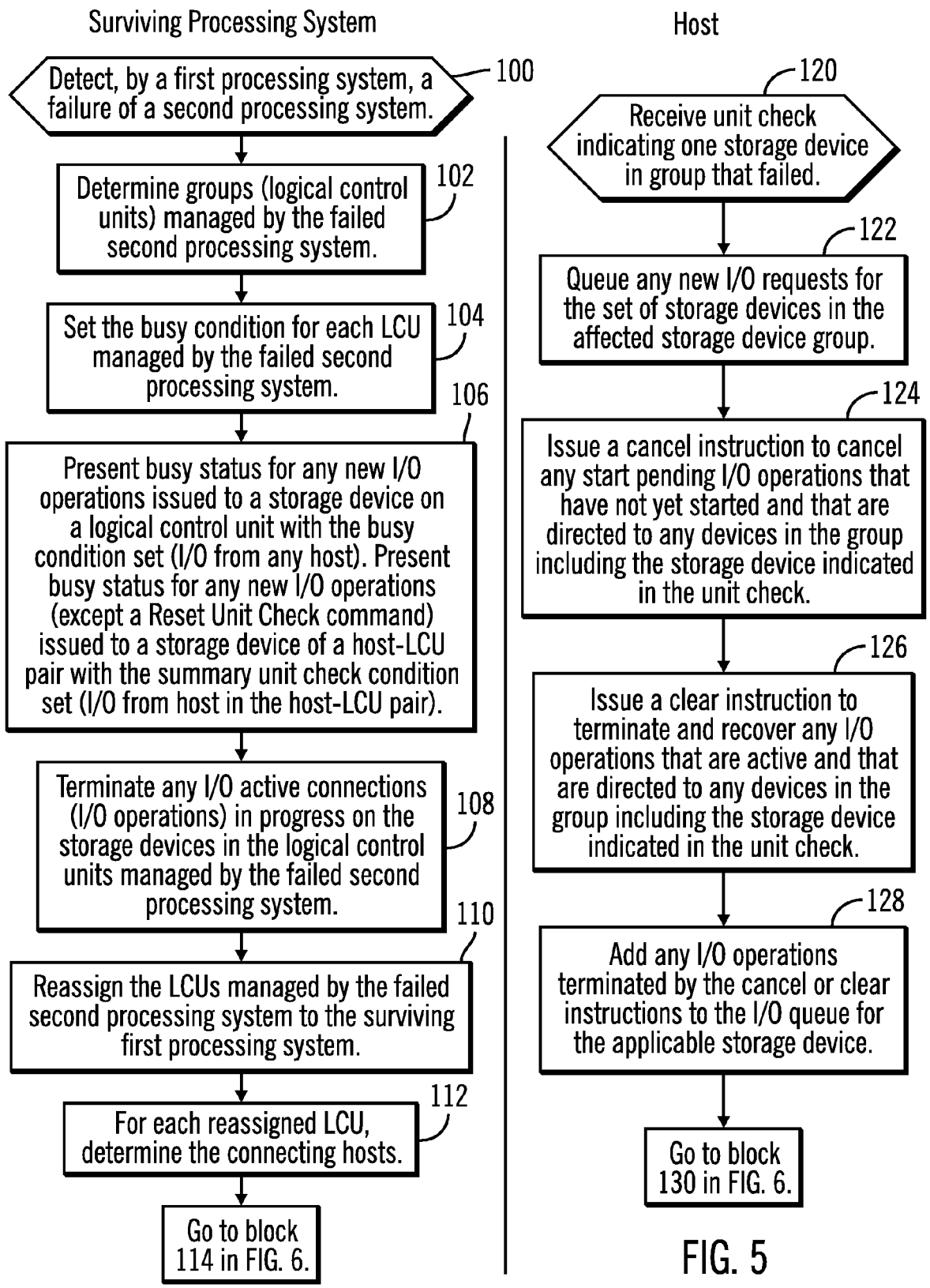
FIGS. 5, 6, and 7 illustrate an embodiment of operations to handle a failover at one processing system in the control unit.
Figure 6:
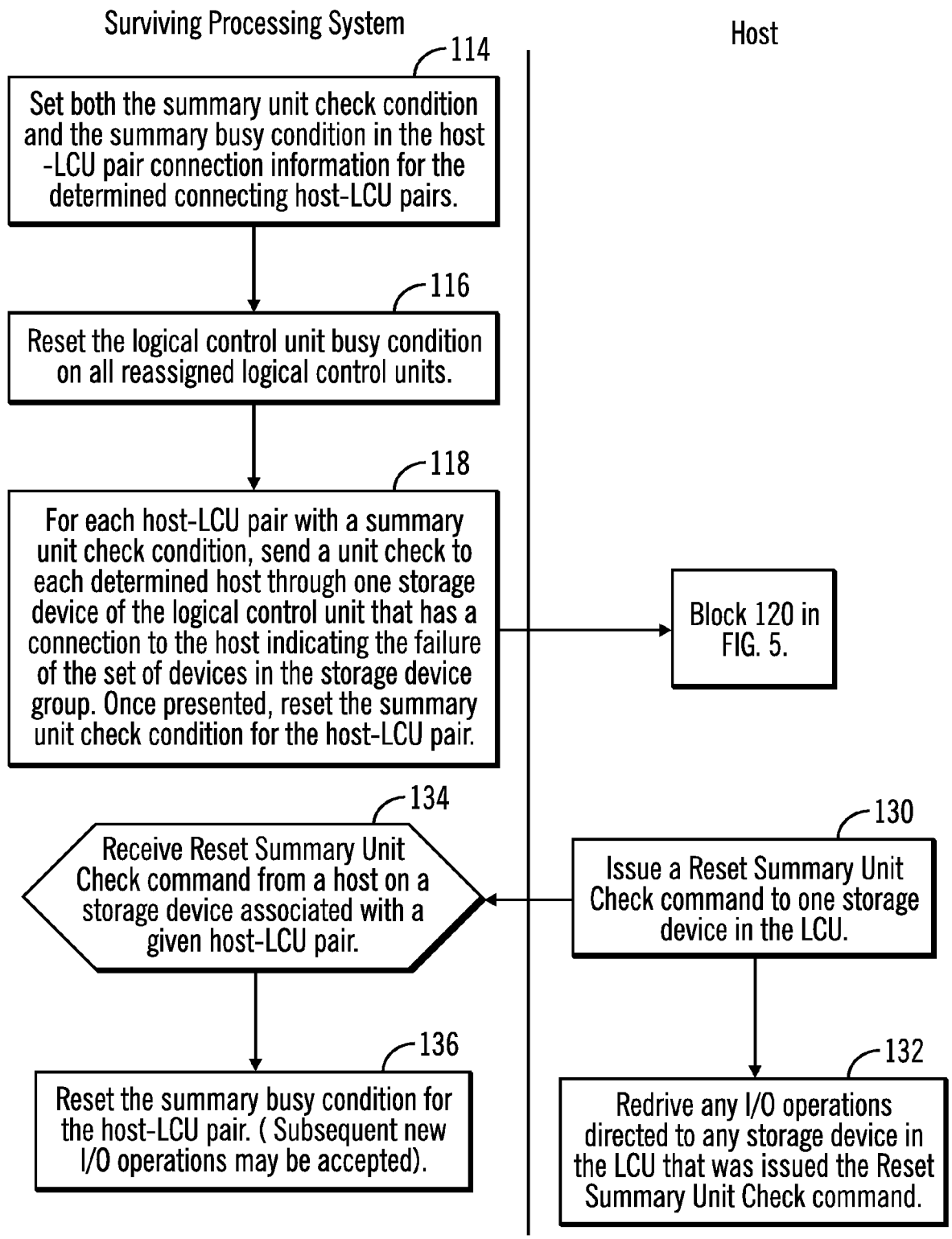

FIGS. 5 and 6 illustrates operations implemented in the I/O manager 24a, 24b executed by the processing systems 20a, 20b and the host channel subsystem 12 to handle a situation where one processing system, e.g., 20b, fails, and the device groups, i.e., logical control units 14a, 14b . . . 14n, managed by the failed processing system 20b are reassigned to the surviving processing system, e.g., 20a. Either processing system 20a, 20b may perform the operations of the surviving processing system. Further, operations described as performed by the channel subsystem 12 may be performed by the host operating system 8. Upon a surviving processing system 20a detecting (at block 100) a failure of a processing system 20b, the I/O manager 24a of the surviving processing system 20a determines (at block 102) device groups, i.e., logical control units 14a, 14b . . . 14n of storage devices, i.e., logical volumes 26a, 26b . . . 26bn managed by the failed processing system 20b. The surviving processing system 20a sets (at block 104) the busy condition for each LCU managed by the failed second processing system, i.e., the busy condition 74 in the LCU information entry 70 for each LCU. The I/O manager 24a presents (at block 106) busy status for any new I/O operations issued to a storage device (volume 26a, 26b . . . 26n) on a logical control unit (LCU) with the busy condition 58 set (I/O from any host). The I/O manager 24a also presents (at block 106) busy status for any new I/O operations (except a Reset Summary Unit Check command and possibly certain other commands not related to processing I/O operations) issued to a storage device (volume) of a host-LCU pair with the summary busy condition 60 set (I/O from host in the host-LCU pair). Also, the I/O manager may not present any unsolicited status conditions to any host while the busy condition is set or to a host associated with the host-LCU pair that has a summary busy condition set. Any I/O active connections (I/O operations) in progress on the storage devices in the logical control units managed by the failed second processing system are terminated (at block 108).

The I/O manager 24a of the surviving processing system 20a reassigns (at block 110) the LCUs managed by the failed second processing system to the surviving first processing system. For each reassigned LCU, a determination is made (at block 112) of the connecting hosts, which may be determined from the connection information entries 50 identifying the reassigned LCU in the field 54 (FIG. 2). The I/O manager 24a then sets (at block 114 in FIG. 6) both the summary unit check condition 60 and the summary busy condition 58 in the host-LCU pair connection information 50 for the determined connecting host-LCU pairs, i.e., the connection information entries 50 identifying the reassigned LCU in field 54 and the determined host in field 52. The logical control unit busy condition 74 is reset (at block 116) in the LCU information entries 70 for all reassigned logical control units. For each host-LCU pair with a summary unit check condition 60 set, the I/O manager 24a sends (at block 118) a unit check to each determined host 2 through one storage device of the logical control unit that has a connection to the host indicating the failure of the set of devices in the storage device group. Once presented, the summary unit check condition 60 for the host-LCU pair is reset so that the unit check is not resent.

In response (at block 120) to receiving a unit check indicating a summary unit check condition from one storage device to which the host 2 connects in a device group (logical control unit 14a, 14b . . . 14n) that failed, the channel subsystem 12 queues (at block 122) any new I/O requests for the set of storage devices (volumes 26a, 26b . . . 26n) in the affected storage device group (logical control unit). The channel subsystem 12 issues (at block 124) a cancel instruction to cancel any start pending I/O operations that have not yet started and that are directed to any devices (volumes 26a, 26b . . . 26n) in the device group (logical control unit 14a, 14b . . . 140n) including the storage device (volume) indicated in the unit check. A clear instruction is further issued (at block 126) to terminate and recover any I/O operations that are active and that are directed to any devices in the device group including the storage device indicated in the unit check. In one embodiment, the operation to recover active I/O operations may involve execution of an error recovery procedure. The cancelled and recovered I/O operations are added (at block 128) to an I/O queue (not shown) in the host memory 6 or channel subsystem 12.

After canceling I/O operations, the channel subsystem 12 issues (at block 130 in FIG. 6) a Reset Summary Unit Check command to one storage device (volume 26a, 26b . . . 26n) in the device group (logical control unit 14a, 14b . . . 14n). The Reset Summary Unit Check command is not subject to the summary busy condition for the storage devices at the I/O manager so that the I/O manager 24a processes the Reset Summary Unit Check command without returning busy notwithstanding that the host-LCU pair associated with the storage device that is the target of the issued command has a summary busy condition set. The channel subsystem 12 further redrives (at block 132) any active I/O operations directed to any storage device in the device groups managed by the failed second processing system.

In response to receiving (at block 134) a Reset Summary Unit Check command from a host 2 to a storage device (volume) associated with a given host-LCU pair, the surviving I/O manager 24a resets (at block 136) the summary busy condition 58 for the host-LCU pair. At this point, subsequent new I/O operations may be accepted.

Figure 7:
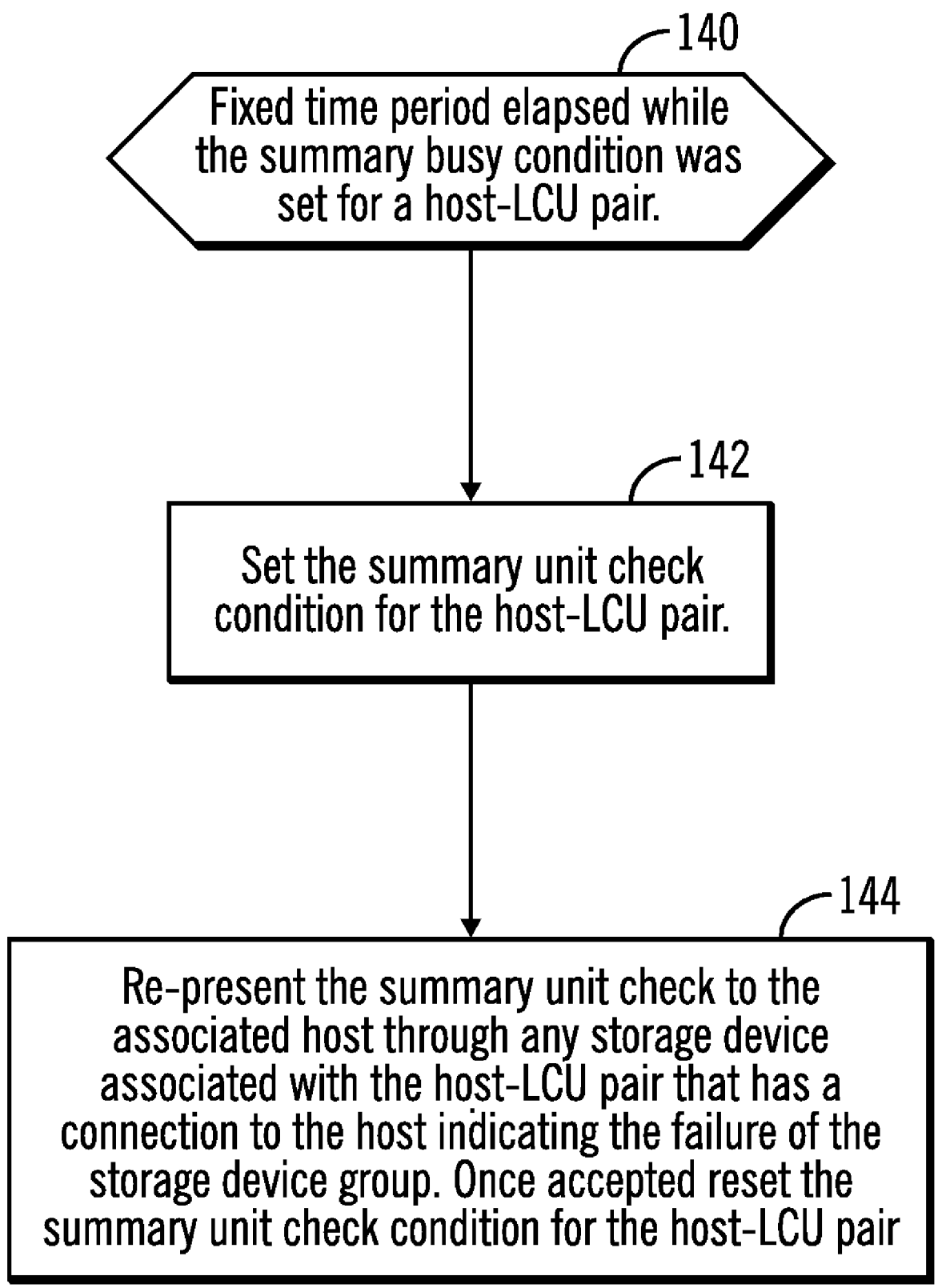

FIG. 7 illustrates operations performed by the I/O manager 24a in the surviving processing system 20a in response to a fixed time period passing (at block 140) while the summary busy condition 58 was set for a host-LCU pair. In response, the I/O manager 24a sets (at block 142) the summary unit check condition 60 for the host-LCU pair. The I/O manager 24a re-presents (at block 144) the summary unit check condition 60 to the associated host through any storage device associated with the host-LCU pair that has a connection to the host indicating the failure of the storage device group. Once the host accepts summary unit check condition, the I/O manager 24a resets the summary unit check condition for the host-LCU pair.

In one embodiment, the operation described herein for aggregating unit checks for a LCU-host pair may be selectively enabled by a given host by issuing a certain command. This allows the storage system to behave appropriately for each host where some hosts have software installed that supports the new mechanism and other hosts may require the old mode of operation.

The described embodiments provide a technique to alert a host of a failure with respect to a device group of storage devices by alerting the host to the failure through one storage device in the device group. In this way, the unit checks for multiple storage devices or volumes are aggregated into a single unit check so as not to overburden the host with unit check signals in systems having thousands of connected devices.

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In described embodiments, the host creates a connection with a device through a set of connection paths. In one embodiment, the mechanism to create connections between a host and a device is to issue a Set Path Group ID command specifying the establish function to the device through each logical path on which the host wants to establish a connection. These commands associate the connections paths to the device from one host in a path group that has a specified path group ID. In one embodiment each attached host may establish its own path group to a given device, each path group with a unique path group ID.

FIGS. 2, 3, and 4 show certain information included in the connection information entry, logical control unit information, and storage device information. In alternative embodiments, this information may be stored in different data structures having different formats and information than shown.

Certain embodiments may be directed to a method for deploying computing instruction by a person or automated processing integrating computer-readable code into a computing system, wherein the code in combination with the computing system is enabled to perform the operations of the described embodiments.

The illustrated operations of FIGS. 5, 6, and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system, comprising:
a first processing system;
a second processing system;
hosts in communication with the first and second processing systems;
a first computer readable medium including first code executed by the first processing system to perform
detecting a failure of the second processing system;
determining at least one device group of storage devices managed by the failed second processing system;
determining for each determined device group hosts that connect to storage devices in the device group;
sending for each determined device group, a unit check to each determined host indicating failure of the device group through one storage device in the device group to which the determined host connects;
a host computer readable medium including second code executed by the determined hosts to perform
executing instructions for each received unit check to terminate any I/O operations in progress on the storage devices in the device group indicated in the received unit check; and
issuing a command to one storage device in each device group for which the unit check was received to end a busy condition for the issuing host.

2. The system of claim 1, wherein the first code is executed by the first processing system to further perform:
terminating, by the first processing unit, any active I/O operations directed to storage devices in the at least one device group managed by the failed second processing system.

3. The system of claim 1, wherein executing, by the determined hosts, instructions to terminate any I/O operations directed to the storage devices in the device group in response to the unit check further comprises:
issuing a cancel instruction to cancel any start pending I/O operations that have not yet started and that are directed to any storage devices in the device group including the storage device indicated in the unit check; and
adding the cancelled I/O operations to an I/O queue.

4. The system of claim 1, wherein executing, by the determined hosts, instructions to terminate any I/O operations directed to the storage devices in the device group in response to the unit check further comprises:
issuing a clear instruction to terminate and recover any I/O operations that are active and that are directed to any storage devices in the device group including the storage device indicated in the unit check; and adding the terminated and recovered I/O operations to an I/O queue.

5. The system of claim 1, wherein the first code is executed by the first processing system to further perform:
    setting a busy condition for each device group managed by the failed second processing system at the point the failure of the second processing unit is detected wherein busy status is presented to any new I/O requests from any hosts received by storage devices in each device group with the busy condition.

6. The system of claim 1, wherein the first code is executed by the first processing system to further perform:
    reassigning each device group of storage devices managed by the second processing system to the first processing system before host requests directed to each device group of storage devices are allowed to continue.

7. The system of claim 1, wherein each device group comprises a logical control unit including a plurality of storage devices, wherein the host connects to each storage device through at least one connection path, wherein the storage device comprises a logical volume, and wherein determining, by the first processing system, hosts that connect to storage devices in the device group comprises determining hosts having at least one active connection path to at least one storage device in the device group.

8. The system of claim 1, wherein the first code is executed by the first processing system to further perform:
    determining, by the first processing system, the hosts with connection to the storage devices in each device group of storage devices with the busy condition; and
    setting, by the first processing system, a summary busy and summary unit check condition for each device group and determined host pair, wherein busy status is presented to any new I/O requests from one host issued to one storage device associated with a host and device group pair having the summary busy condition.

9. The system of claim 8,
    wherein the second code is executed by the determined hosts to further perform receiving the unit check to issue a command to one storage device in the device group including the storage device indicated in the unit check in response to canceling I/O operations, wherein the command is not subject to the summary busy condition; and
    wherein the first code is executed by the first processing system to further perform resetting the summary busy condition for the host and device group indicated in the received command to indicate that the host and the device group are not in the summary busy condition and that I/O requests may be submitted from the host to the storage devices in the device group.

10. The system of claim 9, wherein the first code is executed by the first processing system to further perform:
    resending the unit check indicating failure of the storage devices in the device group in response to not receiving the command for the device group after a fixed period of time.

11. The system of claim 8, wherein the first code is executed by the first processing system to further perform:
    sending unit check status to each host associated with a host and device group pair which has the summary unit check condition set through one storage device associated with the host and device group pair; and
    resetting the summary unit check condition for that host and device group pair once the unit check status is sent.

12. The system of claim 1, wherein the first processing system does not send any unsolicited status to any device associated with the host and device group pair while the busy or summary busy condition is set.

13. An article of manufacture comprising at least one computer readable storage medium implementing first code executed by a first processing system in communication with a second processing system and second code executed by hosts in communication with the first and second processing system, wherein the first code and second code are enabled to cause the first processing system and hosts, respectively, to cause operations to be performed, the operations comprising:
    detecting, by the first processing system, a failure of the second processing system;
    determining, by the first processing system, at least one device group of storage devices managed by the failed second processing system;
    determining, by the first processing system, for each determined device group, hosts that connect to storage devices in the device group;
    sending, by the first processing system, for each determined device group, a unit check to each determined host indicating failure of the device group through one storage device in the device group to which the determined hosts connect;
    executing, by the determined hosts, instructions for each received unit check to terminate any I/O operations in progress on the storage devices in the device group indicated in the received unit check; and
    issuing, by the determined hosts, a command to one storage device in each device group for which the unit check was received to end a busy condition for the issuing host.

14. The article of manufacture of claim 13, wherein the operations further comprise:
    terminating, by the first processing unit, any active I/O operations directed to storage devices in the at least one device group managed by the failed second processing system.

15. The article of manufacture of claim 13, wherein executing, by the determined hosts, instructions to terminate any I/O operations directed to the storage devices in the device group in response to the unit check further comprises:
    issuing a cancel instruction to cancel any start pending I/O operations that have not yet started and that are directed to any storage devices in the device group including the storage device indicated in the unit check; and
    adding the cancelled I/O operations to an I/O queue.

16. The article of manufacture of claim 13, wherein executing, by the determined hosts, instructions to terminate any I/O operations directed to the storage devices in the device group in response to the unit check further comprises:
    issuing a clear instruction to terminate and recover any I/O operations that are active and that are directed to any storage devices in the device group including the storage device indicated in the unit check; and
    adding the terminated and recovered I/O operations to an I/O queue.

17. The article of manufacture of claim 13, wherein the operations further comprise:
    setting, by the first processing system, a busy condition for each device group managed by the failed second processing system at the point the failure of the second processing unit is detected, wherein busy status is presented to any new I/O requests from any hosts received by the storage devices in each device group with the busy condition.

18. The article of manufacture of claim 13, wherein the operations further comprise:

reassigning, by the first processing system, each device group of storage devices managed by the second processing system to the first processing system before host requests directed to each device group of storage devices are allowed to continue.

19. The article of manufacture of claim 13, wherein each device group comprises a logical control unit including a plurality of storage devices, wherein the host connects to each storage device through at least one connection path, wherein the storage device comprises a logical volume, and wherein determining, by the first processing system, hosts that connect to storage devices in the device group comprises determining hosts having at least one active connection path to at least one storage device in the device group.

20. The article of manufacture of claim 13, wherein the operations further comprise:

determining, by the first processing system, the hosts with connection to the storage devices in each device group of storage devices with the busy condition; and setting, by the first processing system, a summary busy and summary unit check condition for each device group and determined host pair, wherein busy status is presented to any new I/O requests from one host issued to one storage device associated with a host and device group pair having the summary busy condition.

21. The article of manufacture of claim 20, wherein the operations further comprise:

issuing, by the hosts receiving the unit check, a command to one storage device in the device group including the storage device indicated in the unit check in response to canceling I/O operations, wherein the command is not subject to the summary busy condition; and resetting, by the first processing system, the summary busy condition for the host and the device group indicated in the received command to indicate that the host and the device group are not in the summary busy condition and that I/O requests may be submitted from the host to the storage devices in the device group.

22. The article of manufacture of claim 21, wherein the operations further comprise:

resending, by the first processing unit, the unit check indicating failure of the storage devices in the device group in response to not receiving the command for the device group after a fixed period of time.

23. The article of manufacture of claim 20, wherein the operations further comprise:

sending, by the first processing system, unit check status to each host associated with a host and device group pair which has the summary unit check condition set through one storage device associated with the host and device group pair; and resetting, by the first processing system, the summary unit check condition for that host and device group pair once the unit check status is sent.

24. The article of manufacture of claim 13, wherein the first processing system does not send any unsolicited status to any device associated with the host and device group pair while the busy or summary busy condition is set.

* * * * *